W. T. SEARS.
THROTTLE CONTROLLING APPARATUS.
APPLICATION FILED JAN. 15, 1917.
1,236,489.
Patented Aug. 14, 1917.
2 SHEETS—SHEET 1.
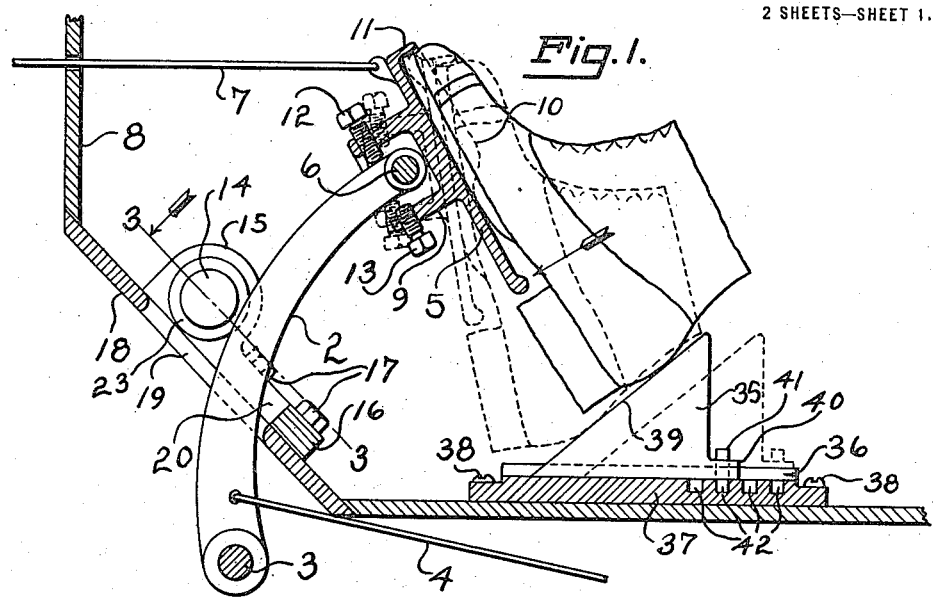
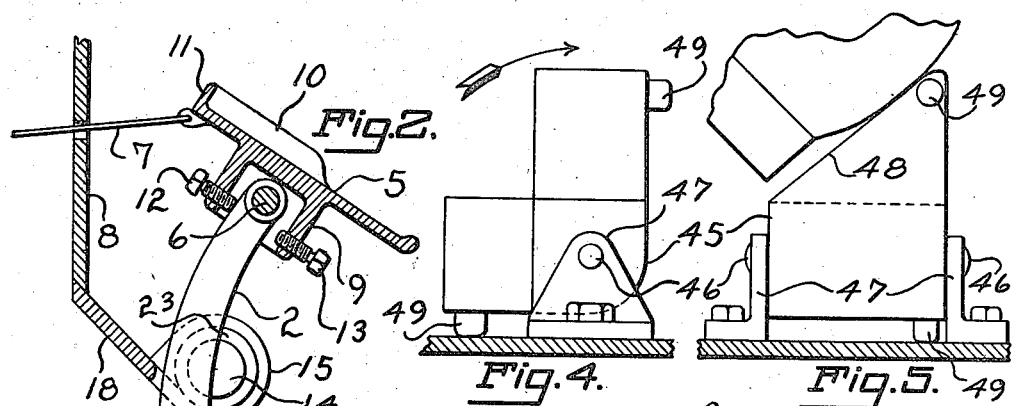
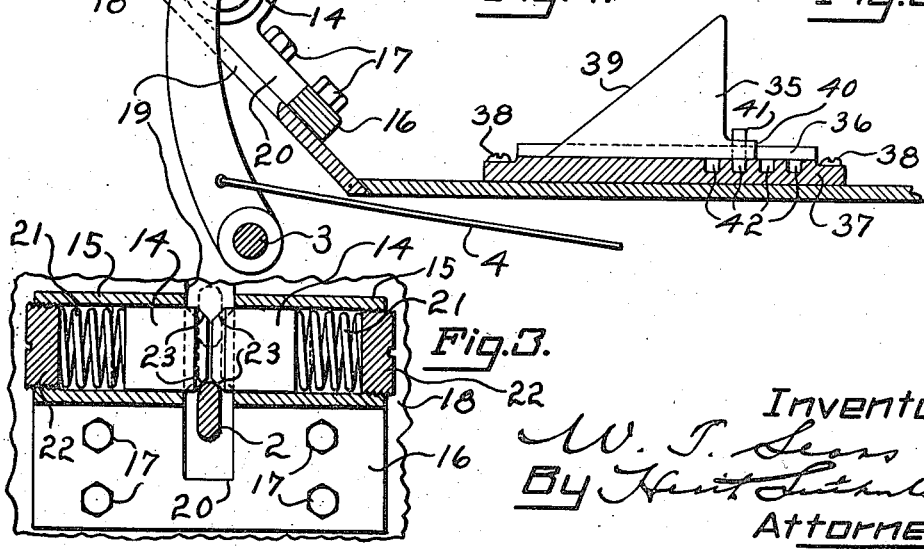
Inventor
W. T. Sears
By [signature]
Attorney W. T. SEARS.
THROTTLE CONTROLLING APPARATUS.
APPLICATION FILED JAN. 15, 1917.
1,236,489.
Patented Aug. 14, 1917.
2 SHEETS—SHEET 2.
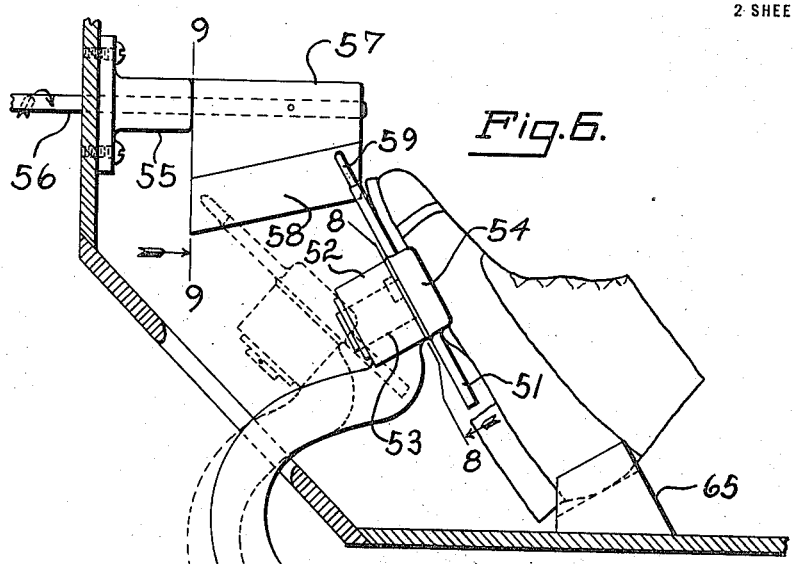
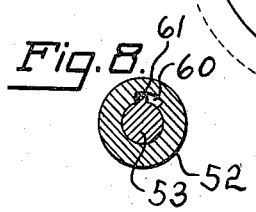
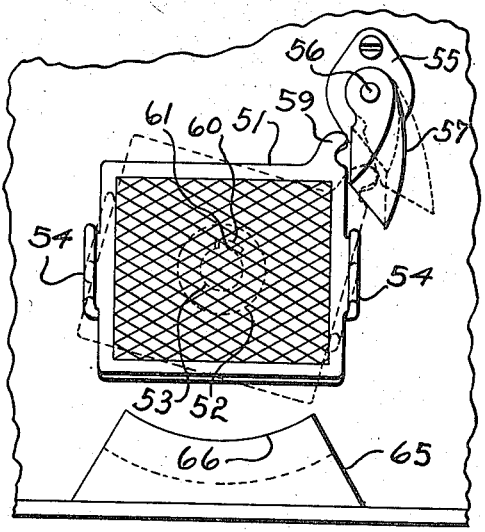
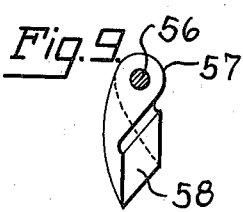
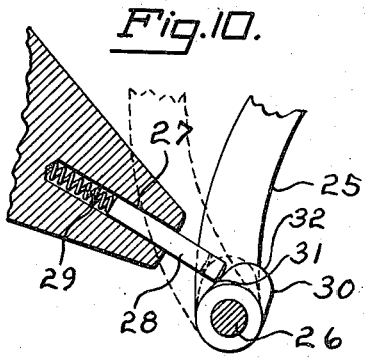
Inventor
W. T. Sears
By Hutt Sutherland
Attorney

UNITED STATES PATENT OFFICE.

WILLARD T. SEARS, OF NEW YORK, N. Y.

THROTTLE-CONTROLLING APPARATUS.

1,236,489. Specification of Letters Patent. Patented Aug. 14, 1917.

Application filed January 15, 1917. Serial No. 142,407.

*To all whom it may concern:*

Be it known that I, WILLARD T. SEARS, a citizen of the United States, residing at New York, in the county of New York and State of New York, have invented certain new and useful Improvements in Throttle-Controlling Apparatus, of which the following is a specification.

This invention relates to a throttle controlling apparatus. While an appliance of this character is susceptible of use in several arts, it is of particular utility when incorporated in or constituting part of the equipment of an automobile. The primary purpose of the invention is the provision of an apparatus of the character set forth which is compact, capable of easy and ready operation and which interferes in no wise with the normal action of the various movement-governing elements of an automobile or like movable body which may be equipped with the apparatus. The invention possesses other features of novelty and advantage which with the foregoing will be stated at length in the following description, wherein I will set forth in detail several convenient forms of embodiment of the invention. I do not restrict myself to this exact disclosure; I may depart therefrom in several respects within the scope of the invention defined by the claims following said description.

Referring to said drawings:

Figure 1 is a sectional side elevation of portion of an automobile furnished with throttle controlling means involving the invention and showing the throttle controlling pedal in different positions by full and dotted lines.

Fig. 2 is a similar view illustrating the lever and parts carried thereby as shifted to effect setting of the brake and opening of the throttle.

Fig. 3 is a transverse section on the line 3—3 of Fig. 1, looking in the direction of the arrow and showing the parts in different positions by dotted and full lines.

Fig. 4 is a front elevation of a foot-rest and supporting means and also illustrates in section the floor board of an automobile.

Fig. 5 is a side elevation of the parts shown in Fig. 4, the floor board also being shown in section.

Fig. 6 is a view corresponding practically to Fig. 1, of a modified form of the apparatus showing the lever and other parts in different positions by full and dotted lines.

Fig. 7 is a view as seen from the right in Fig. 6 of the parts shown in the latter and showing the pedal and certain other parts in different positions by full and dotted lines.

Fig. 8 is a section on the line 8—8 of Fig. 6, looking in the direction of the arrow.

Fig. 9 is a section on the line 9—9 of said Fig. 6, also looking in the direction of the arrow.

Fig. 10 is a detail of the lever shown in Figs. 1, 2 and 3 with a different means for maintaining the same in the out position.

Like characters refer to like parts throughout the several figures.

An automobile is generally equipped with several elements which can be broadly considered as "movement controlling elements", such as levers. One of the elements or levers coacts with a clutch and another with a brake. These two particular levers govern, however, in different ways the movement of the vehicle, and they, therefore, constitute examples of movement controlling elements. One of the features of the invention resides in throttle controlling means involving a suitable pedal, and while as to one phase of the invention this pedal can be carried by any one of these governing elements, I prefer that it be mounted on the brake lever. This brake lever may be of any suitable nature. A form which is in itself common and satisfactory is shown in both Figs. 1 and 2 and is denoted in a general way by 2, being rigid with the shaft 3. This brake lever is shown in the off position in Fig. 1, or as it is sometimes known "out", the brake when said lever is in such position being off or inactive. In Fig. 2 the brake lever is shown as on or "in", the brake at this time being set or operative. The brake bands or equivalents are not shown, although I do illustrate a rod 4 connected with the brake lever for effecting the action of its coöperative brake band to either set or unset the same. This is merely one kind of brake lever. As a matter of fact it is not always essential that the throttle-controlling pedal or analogous member should be supported by the brake lever, although this is the desirable construction.

A throttle controlling pedal as 5 answers my requirements being shown as pivotally supported between its ends as at 6 to the free or upper end of the brake lever 2. To the upper branch of the pedal 5 is pivoted or otherwise suitably connected the rod 7 which has an operative connection with the throttle (not shown) in such manner that when the brake lever is advanced to set the brakes, said rod 7 will be moved forward to cause closing the throttle or at least to secure the minimum supply of hydrocarbon fluid or other agent to the engine. This rod 7 as shown extends through an opening or perforation in the dash 8.

The under side of the pedal 5 is furnished with the chambered projection 9 into which the upper end of said lever 2 extends, the pivot 6 uniting the lever to the side walls of the chambered projection. The flat outer face of the throttle controlling pedal 5, as will be clear, is engageable by the foot of the chauffeur, the pedal having side walls 10 and a front connecting wall 11 within which the sole portion of the foot is received and which act to prevent lateral and forward movement of the foot. In conjunction with the pedal I prefer to provide an adjustable stop which may as shown consist of a screw 12 tapped through the front wall of the chambered projection 9 and the inner end of which is adapted to engage the brake lever 2 near the free end thereof. Owing to the fact that the pedal 5 is pivotally mounted it can be angularly adjusted, the screw 12 being backed out if necessary to permit the necessary adjustment, and when the same is obtained the screw 12 is run in so that its tip will engage the brake lever. This adjustment is necessary to permit that part of the pedal 5 against which the foot is pressed to be located as most convenient to the operator, the position of the pedal differing for various builds of people as regards length of leg, length of foot, etc. Necessarily the pedal 5 has some movement, and to limit this movement I may provide a second stop as 13 which like the stop 12 consists of a screw. The screw 13 as shown is tapped through the rear wall of the chambered portion or extension 9 and its tip or inner end is normally spaced from the brake lever 2 as shown in Fig. 2. In some cases the adjustable stop 13 or equivalent may be dispensed with.

When the adjustable stop 12 abuts against the brake lever 2 as shown in Fig. 1 wherein the brake lever is in its unset, initial or retracted position, the pedal is in effect rigid with the brake lever so that at this time said lever can be moved from the position shown in Fig. 1 to that shown in Fig. 2 to set or partially set the brakes. It will be clear that when the brakes are applied in the manner just mentioned, the rod 7 is caused to move forward and thus effect the closing of the throttle either partially or fully, although in practice the throttle is not fully closed. Were the pedal 5 or its equivalent applied to the clutch lever, the closing of the throttle would follow on the advance movement of the clutch lever to release the clutch. Both the brake lever and the pedal 5 are shown as occupying their normal positions in Fig. 1 by full lines, the dotted lines in this particular figure illustrating how the pedal 5 can be oscillated on the brake lever 2 to effect through the agency of the rod 7 or analogous means the opening of the throttle.

It is absolutely necessary, certainly it is highly desirable, that the brake lever must be firmly held in its out or retracted position. The average brake spring increases its resistance as the brake is applied, and when the brake lever is out or retracted, the spring is at a low tension, the consequence being that the brake lever in the latter event will not present a sufficient and substantial fulcrum upon which the throttle controlling pedal can act. I provide means by which the maximum resistance is applied to the lever when in the out or retracted position, this resistance being progressively decreased on the advance of the brake lever and being practically *nil* when the brake lever is advanced its maximum extent. This particular advantage can be obtained in several different ways, that shown in Figs. 1, 2 and 3 being highly advantageous for the purpose. Referring now particularly to Fig. 3, the numeral 14 denotes two coaxial plungers set in cases as 15 and opposite each other. These cases 15 may be if desired integral with the plate 16 attached by screws 17 or otherwise to the footboard 18, through an elongated slot 19 in which the brake lever 2 extends. This plate 16 is slotted or notched as at 20 to provide for the proper backward movement of the brake lever, the side walls of said slot 20 being approximately coincident with the inner ends of the respective cases 15. In addition to slidingly receiving said plungers 14, the cases receive the springs 21 which respectively back up the plungers 14 and which in turn are backed up respectively by screw plugs 22 threaded for adjustment in the outer ends of the cases. Through the action of the screws or plugs 22, the tension of the respective springs can be varied. The springs it will be clear, constantly press the plungers 14 inward or toward each other. The plungers 22 at their active ends are frusto-conical as at 23. The brake lever when in its retracted position as shown by full lines engages the taper surfaces of the conical portions 23 so that an effectual resistance at this time is offered to the forward movement of the brake lever. This results in providing a substantial fulcrum for the pedal 5. After the brake lever has moved forward a certain distance it will have spread or separated the plungers 14 so that the brake lever beyond this point can ride against the flat inner faces of the frusto-conical portions 23 of the plungers which results in the application of very little resistance at this point to the forward or advance movement of the brake lever, the resistance in fact when the brake lever is against the said flat faces being comparatively slight, merely a little end friction being applied to the sides of the brake lever. It will be apparent that it takes considerable pressure to move the brake lever forward a slight distance, the lever being yieldably locked in its retracted position. This yieldable locking pressure can be varied in different ways, one of which I have already described and that through the operation of the screw plugs 22 to vary the tension of the springs 21. Although the brake lever is firmly held in its retracted position to insure the proper fulcruming of the throttle control pedal 5, it is not a difficult matter to apply the brakes.

In Fig. 10 I have shown a brake lever 25 carried by the shaft 26 equivalents generally speaking of the parts 2 and 3 respectively. A fixed part of the automobile is socketed as at 27 to receive the plunger 28 backed by the spring 29 acting against the cam 30. This cam has the surface 31 merging into the surface 32, the latter being concentric to the axis of rotation of the shaft 26 with which said cam 30 is rigid. The face 31 is a locking face and it is of such inclination or disposition that when engaged by the plunger 27, the brake lever is yieldingly locked in its retracted position as shown by full lines in said Fig. 10. In view of this circumstance said brake lever 25 is firmly held in the back position to insure proper fulcruming of a pedal as 5. On the slight forward movement of the brake lever 25 the free end of the plunger 27 will leave the face 31 and ride onto the ineffective face 32 so as to present a very small amount of resistance to the final advancing movement of said brake.

It is desirable that a rest for the foot be provided. In Figs. 1 and 2 I have shown a rest which is quite satisfactory. It consists of a block as 35 of wood or other suitable material supported in a channel 36 in the upper surface of the base 37 fastened by screws 38 or otherwise to the floor-board of the automobile. This rest or block has a bevel surface 39 which extends in a forward and downward direction and against which the heel portion of the foot is placed while the sole portion of the foot is on the pedal 5. This rest or support 35 is adjustable as shown by dotted lines to conform to the length of foot or otherwise and any suitable means such as those now to be described may be provided. As illustrated the rest or support 35 is provided with a lug 40 perforated to receive the pin 41 which can enter any one of the sockets 42 in the base 37 to hold said rest or support 35 in its longitudinally adjusted position. In Figs. 4 and 5 I show a different type of rest consisting as shown of a practically right angular element 45 pivoted at its elbow as at 46 between the upstanding portions of angle brackets 47 fastened at their bases to the floor-board of the car in proper proximity to the brake lever or other part. The arms or branches of this member 45, it will be noted, are of different lengths, the one standing upright in said Figs. 4 and 5 being somewhat longer than the companion arm. The free ends of the arms or branches of the rest 45 are downwardly and forwardly beveled as at 48 to receive the heel portion of the foot as shown in Fig. 5. As I have already observed, the longer branch of the rest 45 is standing upright, so that this branch will then act as a rest, the other branch being inactive. The rest 45 can be operated to bring the long arm thereof horizontal and the short arm upright, so that the latter can act as a rest, thus providing adjustment for the operator of the machine. The arrow in Fig. 4 indicates the motion of the part 45 when the long arm of the rest is swung out of and the short arm into action. The arms may if desired be equipped with stops or pads as 49 to alternately engage the floor-board of the car. In some cases these pads may be dispensed with.

In Fig. 1 the parts are shown as occupying their normal positions by full lines. By tipping the pedal 5 from the full line to the dotted line position, the rod 7 will be drawn to the right to effect the opening of the throttle to obtain "acceleration" as it is called, the amount of opening movement of the throttle being determined by the extent of tilting movement of the pedal. It will be clear that the pedal can be freely oscillated to open and close the throttle as may be required in driving by the tipping of the driver's foot without possibility of setting the brake, but the brake as noted, can be set by thrusting the brake lever 2 forward with the necessary force applied primarily to the pedal and this action, as will be understood is followed by a closing of the throttle to the requisite extent.

In Figs. 6 to 9 inclusive I have illustrated another of many different forms which I will now describe. In this construction the brake lever 50 may be held in its retracted position by either of the ways already described or in any other suitable manner. In the organization described particularly in connection with Figs. 1, 2 and 3 the throttle controlling pedal is tipped about a horizontal axis by the foot, or one approximately in parallelism with the axis of motion of the lever 2. In the construction shown in detail, however, in Figs. 6 and 7 the pedal 51 in its throttle controlling movement is turned about an axis transverse to the axis of movement of the brake lever 50. Said brake lever 50 is shown in its initial or unset position by full lines in Fig. 6 and in its advanced position by dotted lines in said view. When the latter relation is present, the brakes will be set or partially set. The pedal 51 instead of being given a tipping motion is turned or twisted by a corresponding twist or turning of the foot of the driver. This brake lever 50 is provided at its free end with a hub or boss 52 to receive the rigid stud 53 extending from the under or forward side of the pedal 51. The front or back surface of said pedal 51 may as shown in Fig. 7 be roughened by milling or otherwise and at its sides may be provided with lugs or ears 54 between which the foot is received to thus make easy the turning of said pedal. The dash of the automobile is provided with a bearing 55 to receive the throttle controlling rod 56 which unlike the rod 7 turns about its longitudinal axis as indicated by the arrow applied thereto in Fig. 6 to effect the necessary action of the throttle. Said rod 56 at its rear end is provided with a depending rigid arm 57 cooperative with the pedal 51 as will hereinafter more particularly appear. For a reason that will also hereinafter appear, said pendent arm 57 has a spiral or forwardly and laterally disposed bevel surface 58. The pedal 51 as shown is practically rectangular in form and has at or near one corner thereof or that adjacent the arm 57, the finger 59.

The parts are shown as occupying their normal or initial positions by full lines in Figs. 3 and 4, the throttle at this time being assumed to be closed or virtually so and the pendent arm 57 being vertical. To open the throttle the pedal 51 will be swung around to the dotted line position in Fig. 7, thus causing the finger 59 to engage the arm 57 and rock said arm to the dotted line position in Fig. 7 and correspondingly rock the rod or shaft 56, thus opening the throttle, the amount of opening movement of the throttle depending upon the degree of turning movement of the pedal 50. It will be supposed that it is desired to set the brakes governed by the lever 50. In this case the pedal 51 is pressed forward, thus correspondingly moving the lever 50 as shown by the dotted lines in Fig. 6, the projection or finger 59 riding along the spiral surface 58 on the brake setting movement of said lever 50. This projection or finger 59 should never move clear of the spiral surface 58. No matter to what position or how far over the control pedal may be thrown, the mere act of pushing the pedal forward will permit the throttle to close. The hub or boss 52 may have a segmental slot 60 to receive the projection or key 61 on the stud or journal 53 to limit the lateral motion of the throttle controlling pedal 51.

There is one important feature to which I desire to call attention, and that is the fact that in both forms of the invention, one shown by Figs. 1 to 3 inclusive and the other illustrated by Figs. 6 to 9 inclusive, when the brake lever is operated to set the brake or brakes, the throttle valve will be freed and can be instantly closed either fully or to the necessary extent.

I may in connection with the form of the device shown by Figs. 6 to 9 inclusive and as illustrated partly in Figs. 6 and 7, provide a foot-rest as 65 arranged below and back of the pedal 51. The upper surface of this foot-rest which is generally stationary is upon an arc as shown at 66, the arcuate surface being downwardly and forwardly inclined. This surface is struck from an arc practically concentric with the axis of motion of said pedal 51 to thus permit the free side movement of the foot of the operator when actuating said pedal 51.

What I claim is:

1. The combination of an automobile-movement-governing element, a throttle controlling member supported by said element for movement relatively thereto, means cooperative with said throttle controlling member for permitting the throttle to close on the advance of said automobile-movement-governing element, and means for yieldingly resisting the advancing movement of said element and for decreasing the resistance at a predetermined point in said advancing movement.

2. The combination of an automobile-movement-governing element, a throttle controlling member supported by said element for movement relatively thereto, means cooperative with said throttle controlling member for permitting the throttle to close on the advance of said automobile-movement-governing element, and means for resisting the advancing movement of said element and for decreasing the resistance at a predetermined point in said advancing movement.

3. The combination of the brake lever of an automobile, a throttle controlling member supported by said lever for movement relatively thereto, and means for resisting the advancing movement of said lever and for decreasing the resistance at a predetermined point in said advancing movement.

4. The combination of the brake lever of an automobile, a throttle controlling pedal pivotally supported by said brake lever, and means for resisting the advancing movement of the lever and for decreasing the resistance at a predetermined point in said advancing movement.

5. The combination of an automobile-movement-governing element, a throttle controlling member supported by said element for movement relatively thereto, and spring actuated means for resisting the advancing movement of said element and for effecting a decrease in the resistance at a predetermined point in said advancing movement.

6. The combination of a swinging automobile-movement-governing element, a throttle controlling member movably supported by said element, and spring actuated plungers having taper faces to engage said element when the latter is in the retracted position thereof, said element on its advance acting to separate and to be located between the plungers to thus decrease the pressure of the plungers against the element.

7. The combination of a swinging automobile-movement-governing element, a throttle controlling member movably supported by said element, and spring actuated plungers having taper faces to engage said element when the latter is in the retracted position thereof, said element on its advance acting to separate and to be located between the plungers to thus decrease the pressure of the plungers against the element, and means for varying the tension of the springs of the plungers.

8. The combination of an automobile-movement-governing element, a throttle controlling member movably supported by said element, a pair of spring-actuated coaxial plungers opposed to each other, the inner ends of the plungers being of frusto-conical shape and the tapered surfaces of the frusto-conical portions engaging said element when the latter is in the retracted position, whereby maximum resistance is offered to the advancing movement of the element, said element by engaging against said tapered surfaces spreading the plungers to occupy a space therebetween whereby the resistance of the plungers to the further advancing movement of the element will be materially reduced.

9. The combination of a movable automobile-movement-governing element, a throttle controlling member movably supported by said element, and means for yieldably resisting the advancing movement of said element and for progressively decreasing said resistance as said element is advanced.

10. The combination of an automobile-movement-governing element, a throttle controlling member movably slidingly supported by said element, and a foot-rest to support the back of the heel portion of the foot of the operator when the sole portion of the foot is against said member.

11. The combination of an automobile-movement-governing element, a throttle controlling member movably slidingly supported by said element, and a foot-rest to support the back of the heel portion of the foot of the operator when the sole portion of the foot is against said member, said rest being adjustably mounted.

12. The combination of a swinging automobile-movement-governing element, a throttle controlling member movably supported by said element, and an adjustable stop for holding the throttle controlling member in a predetermined adjusted fixed relation with the element.

13. The combination of the brake lever of an automobile, a throttle-controlling member supported by said brake lever, and a screw carried by one of the parts and engaging the other to hold the pedal in a predetermined adjusted and rigid relation with the brake lever.

14. The combination of a swinging automobile-movement-governing element, a throttle controlling member pivotally supported by said element, and a screw tapped through the member and engaging the element to hold the member in a predetermined and rigid adjusted relation with respect to the element.

15. The combination of an automobile-movement-governing lever and a foot-rest in coöperative relation therewith, the foot-rest comprising two arms of different lengths united with and at right angles to each other, the foot-rest being pivoted at the juncture of the arms to permit the arms to be brought alternately into upright relation and each of the arms having a downward and forward foot-supporting beveled surface to slidingly receive the back of the heel portion of the foot of the operator.

16. The combination of an automobile-movement-governing lever and a foot-rest in coöperative relation with the lever, the foot-rest being longitudinally adjustable and being provided with means to hold it in an adjusted position and also provided with means to slidingly receive the back of the heel portion of the foot of the operator.

17. The combination of a brake lever, an oscillating foot pedal mounted on the brake lever, a connection extending from said pedal to permit the closing of the throttle when the brake lever is thrown forward, and spring means for holding the brake lever in a backward position for exerting pressure upon the lever and for effecting a decrease in said pressure as the lever is moved forward.

In testimony whereof I affix my signature in the presence of two witnesses.

WILLARD T. SEARS.

Witnesses:
H. W. HAZARD, Jr.,
E. A. EVERITT, Jr.